United States Patent [19]
Kilper et al.

[11] Patent Number: 5,027,939
[45] Date of Patent: Jul. 2, 1991

[54] SORTING CONVEYOR SYSTEM

[75] Inventors: John J. Kilper, Fenton; Dennis Wiggers, Richmond Heights, both of Mo.

[73] Assignee: Alvey Inc., St. Louis, Mo.

[21] Appl. No.: 469,259

[22] Filed: Jan. 24, 1990

[51] Int. Cl.$^5$ .............................................. B65G 47/46
[52] U.S. Cl. .................................. 198/365; 198/370; 198/372
[58] Field of Search ............... 198/365, 366, 367, 370, 198/372, 440, 456, 457, 458, 802

[56] References Cited

U.S. PATENT DOCUMENTS

| | | | |
|---|---|---|---|
| 3,009,572 | 11/1961 | Seaborn | 198/365 |
| 3,093,245 | 6/1963 | Worchester et al. | 198/365 X |
| 3,129,803 | 4/1964 | Giulie et al. | 198/802 |
| 3,190,432 | 6/1965 | Vanderhoof | 198/365 X |
| 3,277,995 | 10/1966 | Seed | 198/802 |
| 3,286,815 | 11/1966 | Shuster et al. | 198/802 X |
| 3,780,850 | 12/1973 | McSwiggin | 198/802 |
| 3,986,596 | 10/1976 | Hamilton | 198/365 |
| 4,143,752 | 3/1979 | Del Rosso | 198/365 |
| 4,711,341 | 12/1987 | Yu et al. | |
| 4,717,011 | 1/1988 | Yu et al. | 198/372 X |
| 4,732,259 | 3/1988 | Yu et al. | |
| 4,738,347 | 4/1988 | Brouwer et al. | |
| 4,760,908 | 8/1988 | Houghton | |
| 4,896,760 | 1/1990 | Triantafilou et al. | 198/372 X |

FOREIGN PATENT DOCUMENTS

| | | | |
|---|---|---|---|
| 2912298 | 12/1979 | Fed. Rep. of Germany | 198/440 |
| 3538875 | 5/1986 | Fed. Rep. of Germany | 198/365 |
| 0085757 | 5/1982 | Japan | 198/365 |
| 0007130 | 1/1986 | Japan | 198/365 |
| 0127519 | 5/1989 | Japan | 198/456 |

Primary Examiner—Robert P. Olszewski
Assistant Examiner—James R. Bidwell
Attorney, Agent, or Firm—Jacox & Meckstroth

[57] ABSTRACT

An endless flexible apron or carrier assembly includes a pair of parallel spaced endless drive chains connected by longitudinally spaced parallel cross tubes which slidably support a series of package transfer pushers. The drive chains are supported by parallel spaced elongated side frame members which also support one or more sets of modular crossover sender, receiver and switch units. The side frames have longitudinally spaced sets of holes for conveniently positioning the sets of units at longitudinally selectable locations. Each pusher has a load carrying roller and a smaller guide roller which engages long wearing guide surfaces on repositioning blocks and on the sender and receiver units, and the guide rollers also engage a multiple step divider block on the sender unit. The crossover units are connected by guide tracks with linear sections positioned at different angles, and the chains extend around sprockets mounted on end shafts which also support resilient disks for engaging the pushers carried by the cross tubes.

19 Claims, 3 Drawing Sheets

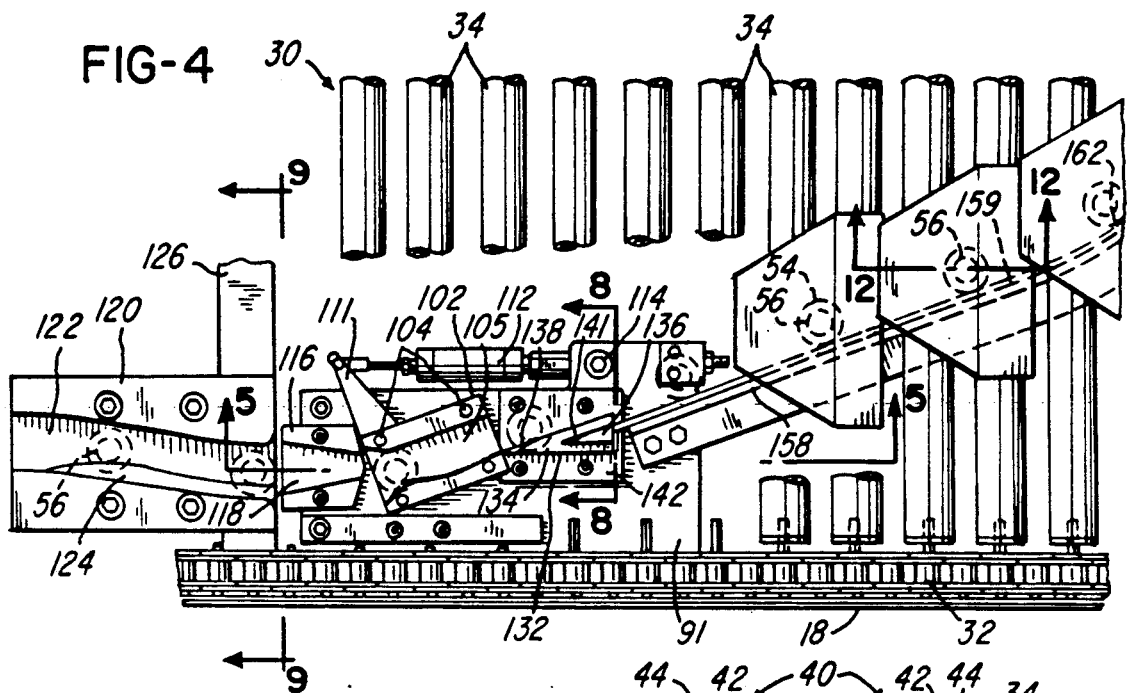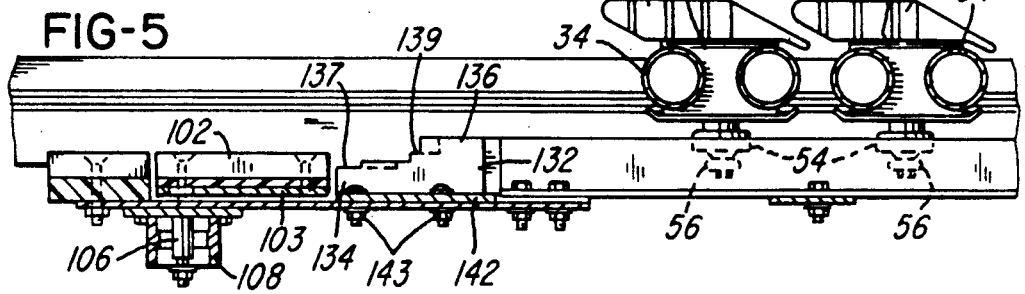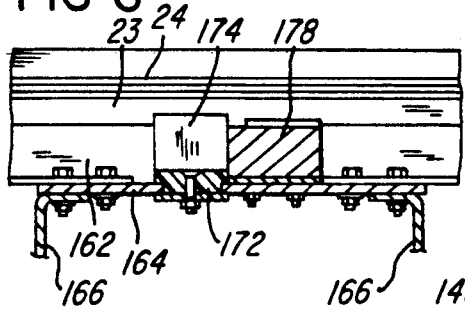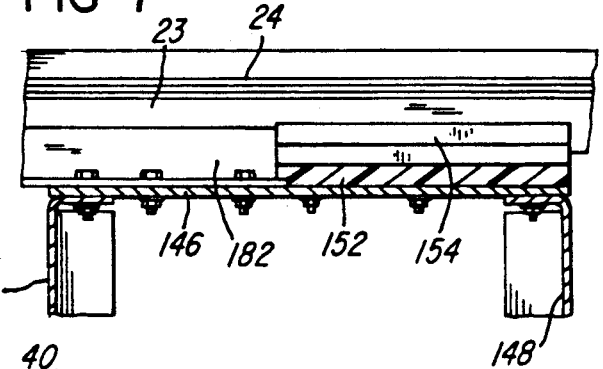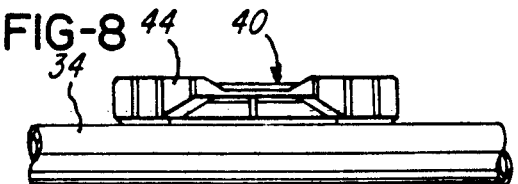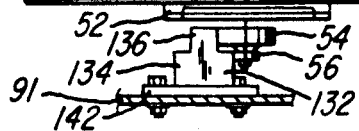

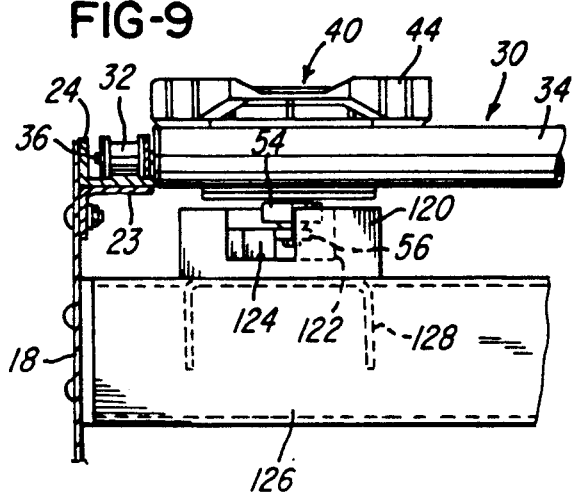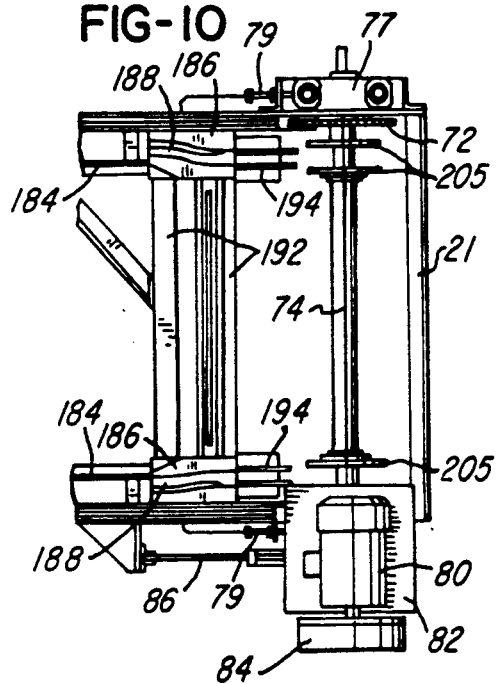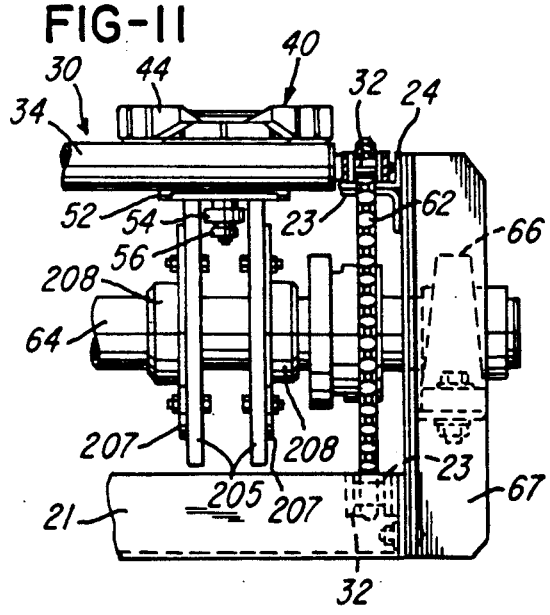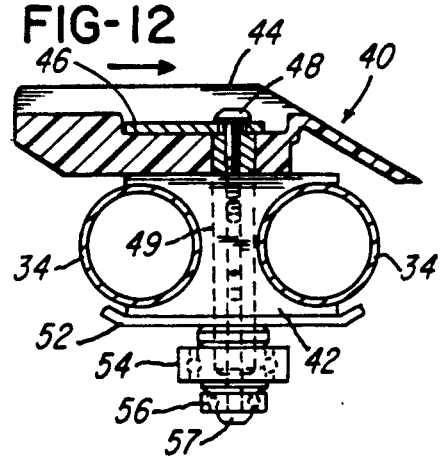

SORTING CONVEYOR SYSTEM

BACKGROUND OF THE INVENTION

The present invention relates to automatic package or article sorting conveyors of the general type disclosed in U.S. Pat. Nos. 4,711,341, No. 4,732,259, No. 4,738,347 and No. 4,760,908, the disclosures of which are herein incorporated by reference. Commonly, such conveyors include an endless apron or carrier assembly formed by a pair of parallel spaced endless drive chains connected by longitudinally spaced cross tubes with pairs of tubes slidably supporting package or article transfer pushers. The endless chains are supported by a frame including parallel spaced side frame and cross frame members which also support one or more prelocated crossover networks each including sender, receiver and switch components connected by diagonally extending tracks for shifting the pushers laterally on the cross tubes between the side frame members.

In some applications of such sorting conveyors, it is desirable to operate the conveyor at a relatively high speed, for example, over 400 or 500 feet per minute, without having significant wear on the conveyor components and while minimizing the noise of conveyor operation and the shock or impact on the packages when shifting the packages laterally from the conveyor onto take-away or spur conveyors. The sorting conveyors are constructed with the crossover networks prelocated along the length of the conveyor. That is, prior to construction of the sorting conveyor, a layout is made with the crossover networks located according to the desired location of the spur conveyors. However, if it is desired to change the location of a crossover network or add another crossover network after the sorting conveyor has been installed, for example, to accommodate a new location for a take-away spur conveyor, the sorting conveyor must be substantially modified. This results in considerable expense and down time of the sorting conveyor in order to install a new or relocate a crossover network.

SUMMARY OF THE INVENTION

The present invention is directed to an improved package or article sorting conveyor of the general type disclosed in the above mentioned patents and which provides several new and desirable features and advantages. More specifically, the sorting conveyor of the invention provides for conveniently locating or relocating or adding modular crossover units according to the original predetermined locations for the take-away spur conveyors and to accommodate a spur conveyor at a new location. The sorting conveyor of the invention also permits higher speed operation of the endless conveyor apron or carrier while minimizing wear of the crossover units and pusher units. In addition, the construction of the sorting conveyor minimizes the noise of operation and reduces the impact forces on packages during lateral transfer of the packages onto a spur conveyor by the pusher units.

In accordance with one embodiment of the invention, the above features and advantages are provided by a sorting conveyor having side frame plates or members with longitudinally spaced sets of holes. The holes provide for selectively locating cross frame members and also supports for crossover sender, receiver and switch units. The longitudinally spaced holes extend substantially the full length of the side frame members so that the crossover units may be conveniently and quickly installed at any location along the length of the sorting conveyor which may be several hundred feet.

The article pusher units of the invention each incorporates a load carrying upper anti-friction bearing or roller and a smaller anti-friction guide bearing or roller disposed under the upper roller. The smaller guide rollers guide the pusher units through the sender and receiver units and engage resilient guide surfaces. The larger load-carrying rollers engage the crossover tracks which are provided with linear sections at different angles to minimize shock to the packages during high speed operation of the sorting conveyor. The pusher units also incorporate base plates which engage resilient wheels or disks supported by the end shafts of the conveyor to help in minimizing the operating noise of the conveyor at higher speeds.

Other features and advantages of the invention will be apparent from the following description, the accompanying drawings and the appended claims.

BRIEF DESCRIPTION OF THE DRAWINGS

FIG. 4 is an enlarged plan view of a sender unit shown in FIG. 2 and showing in phantom the path of the pusher units supported by the cross tubes;

FIG. 5 is an enlarged fragmentary section of a sender unit, taken generally on the line 5—5 of FIG. 4;

FIG. 6 is an enlarged fragmentary section of the crossover switch unit, taken generally on the line 6—6 of FIG. 2;

FIG. 7 is an enlarged fragmentary section with a crossover receiver unit, taken generally on the line 7—7 of FIG. 2;

FIG. 8 is an enlarged fragmentary section taken generally on the line 8—8 of FIG. 4;

FIG. 9 is an enlarged fragmentary section taken generally on the line 9—9 of FIG. 4;

FIG. 10 is a fragmentary plan view of the head or drive end portion of the sorting conveyor and with the endless apron or carrier removed;

FIG. 11 is a fragmentary end view of the conveyor as taken generally on the line 11—11 of FIG. 2; and FIG. 12 is an enlarged fragmentary section of a pusher unit, taken generally on the line 12—12 of FIG. 4.

DESCRIPTION OF THE PREFERRED EMBODIMENT

Figure 1:
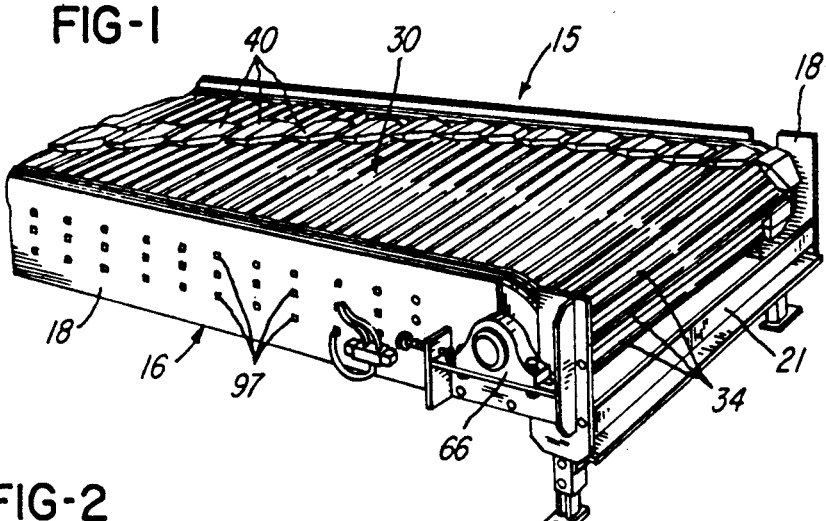
FIG. 1 is a perspective view of an end portion of a sorting conveyor constructed in accordance with the invention.
Figure 2:
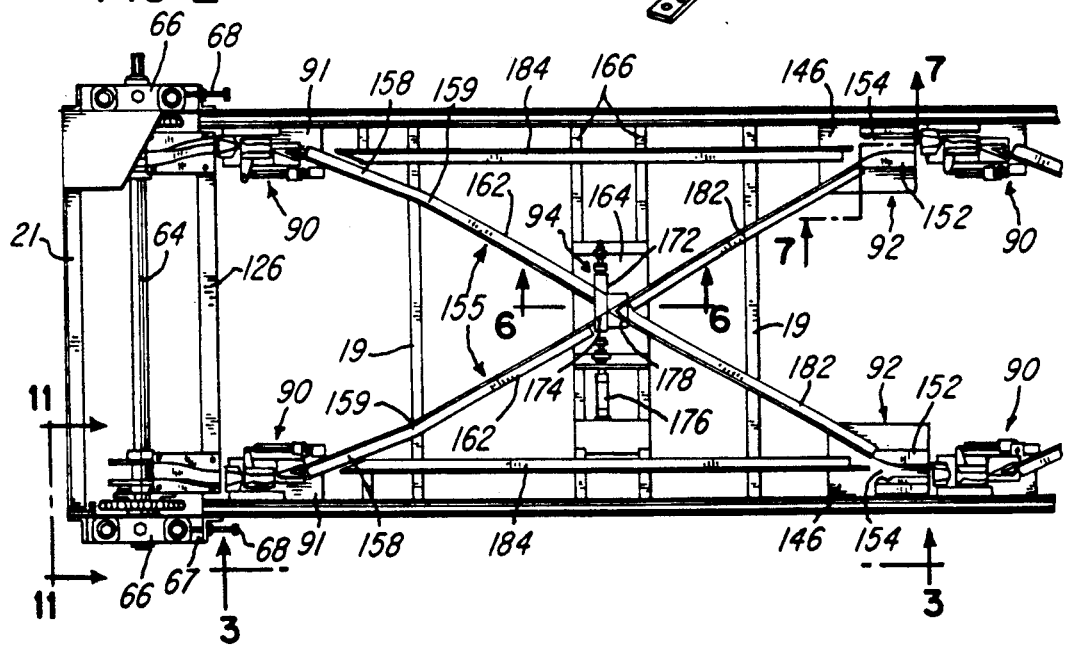
FIG. 2 is a plan view of the conveyor end portion shown in FIG. 1 with the endless carrier or apron removed to show the pusher crossover units and guide blocks.

A sorting conveyor 15 constructed in accordance with the invention, is illustrated in FIG. 1 and includes an elongated fabricated steel frame 16 formed by parallel spaced side frame members or plates 18 which are rigidly connected by a series of longitudinally spaced cross frame members 19 and 21 (FIG. 2). Upper and lower angle rails 23 (FIGS. 9 and 11) are supported by each side plate 18 and extend the length of the plate for supporting a corresponding guide track 24 extruded from a low friction plastics material. The frame 16 may have any length up to several hundred feet.

An endless conveyor apron or carrier 30 is supported for movement by the frame 16 and includes parallel spaced endless flexible drive chains 32 (FIGS. 9 and 11) each having upper and lower runs supported by the corresponding plastic tracks 24. The drive chains 32 are connected by longitudinally spaced carrier members or tube assemblies 34 each having end journals 36 (FIG. 9) projecting axially outwardly to connect links of the chains 32.

Each pair of adjacent tubes 34 support a sliding pusher assembly 40 each including a slide block 42 (FIG. 12) constructed of a low friction plastics material and having semi-cylindrical recesses for receiving the pair of tubes 34. A molded plastic pusher top 44 is secured to the top of each guide block 42 by a plate 46 and a threaded fastener 48 to a threaded tube 49 extending through the center of the guide block 42. A metal guide or stiffener plate 52 is secured to the bottom of the guide block 42 of each pusher 40 by a set of screws (not shown). The lower end portion of the tube 49 carries a set of anti-friction bearings including a load-carrying bearing or roller 54 and a smaller guide bearing or roller 56 which are secured to the tube 49 by a threaded fastener 57.

Each of the pusher units 40 is free to slide laterally on its pair of supporting tubes 34 and between the support rails 23 for the drive chains 32. At the tail end portion of the sorting conveyor 15 (FIGS. 1, 2 and 11), the chains 32 extend around a corresponding pair of sprockets 62 mounted on a cross shaft 64 supported for rotation by a set of bearings 66. The bearings are mounted on brackets 67 secured to the side plates 18 of the frame 16, and adjusting screws 68 (FIG. 2) provide for shifting the bearings 66 to adjust for precision alignment of the chains 32 with the sprockets 62. At the opposite or head end of the conveyor 15 (FIG. 10), the chains 32 extend around another pair of sprockets 72 mounted on a head or drive shaft 74 supported by a set of bearings 77. A set of adjustment screws 79 (FIG. 10) provide for moving the bearings 77 to adjust for precision alignment of the chains 32 with the sprockets 72. An electric motor 80 is supported by a base plate 82 pivotally mounted on the frame 16 and has a shaft connected by a belt drive (not shown) to the outer end portion of the drive shaft 74. The belt drive is enclosed within a guard 84, and an adjustable torque arm 86 counteracts the driving torque.

Figure 3:
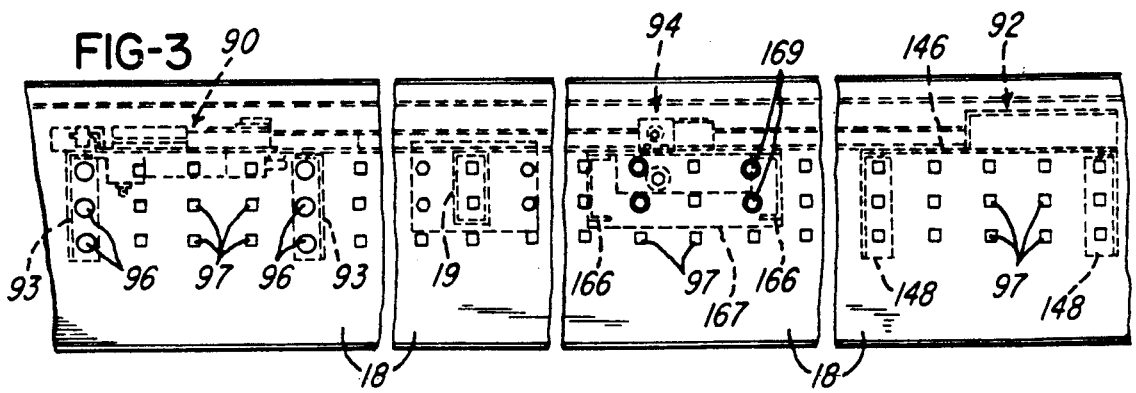
FIG. 3 is a fragmentary elevational side view of the sorting conveyor and taken generally along the line 3—3 of FIG. 2.

Referring to FIG. 2, the sliding movement of the pusher units 40 on the corresponding support tubes 34 and laterally between the side plates 18 of the frame 16, is controlled by one or more crossover systems each including one or more sender units 90, one or more receiver units 92 and sometimes a crossover switch unit 94. Each of the sender units 90 is supported by a platform 91 which includes a pair of parallel spaced and opposing legs or brackets 93 (FIG. 3) each of which is secured to the adjacent side frame member or plate 18 by a set of three carriage head bolts 96. The bolts 96 extend through corresponding square holes 97 formed in the adjacent side plate 18. As shown in FIG. 3, each of the side frame members or plates 18 is provided with a series of longitudinally spaced sets of square holes 97 which are located at predetermined intervals, for example, three inches, along the entire length of the side plate 18. Thus the pair of sender units 90 may be conveniently and quickly installed on the side plates 18 at any selected longitudinal location where it is desired to have a package or article diverted from the sorting conveyor 15.

Referring to FIG. 4, each of the sender units 90 (FIG. 2) includes a channel-shaped diverter block 102 which is preferably formed of a low friction rigid plastics material and is secured to a metal plate 103 (FIG. 5) by a set of screws 104. The plate 103 defines a channel 105 and is supported for pivotal movement by a vertical shaft 106 (FIG. 5) supported by bearings retained within a collar 108 secured to the platform 91. The plate 103 has a laterally projecting arm 111 (FIG. 4) which is pivotally connected to a fluid or air actuating cylinder 112 pivotally connected to the platform 91 by a pin 114. Actuation of the cylinder 112 pivots the diverter block 102 between a diverting position (FIG. 4) and an aligned position (FIG. 2) where the channel 105 is generally parallel with the side frame plate 18.

Each sender unit 90 also includes an alignment block 116 (FIG. 4) which is also preferably formed from a low friction rigid plastics material and defines a converging channel 118 which aligns with the channel 105 within the diverter block 102. Referring to FIGS. 2 and 4, a repositioning block 120 is constructed of a slightly resilient polyurethane plastics material and defines a curved or S-shaped channel 122 having an exit which aligns with the channel 118 within the alignment block 116. The block 120 has a step portion 124 (FIG. 9) which projects inwardly into the lower portion of the channel 122, as shown in FIG. 4. The blocks 120 are supported by a cross frame member 126 (FIGS. 2 and 9) secured to the side plates 18 by sets of bolts 96, and a channel-shaped bracket 128 (FIG. 9) projects from the cross frame member 126 to aid in supporting each repositioning block 120.

Each of the sender units 90 also includes a multiple step divider member or block 132 (FIG. 4) which has a lower V-shaped portion 134 (FIG. 5) and an upper V-shaped portion 136. A shallow step 137 is formed within the lower V-shaped portion 134 and forms a vertical cam surface 138. A deeper step 139 is formed within the upper V-shaped portion 136 and forms a second vertical cam surface 141 (FIG. 4). Preferably, the divider block 132 is formed of steel and is welded to a base plate 142 which is secured to the platform 91 by a set of bolts 143.

Referring to FIGS. 2 and 7, each of the receiver units 92 includes a support platform 146 which includes a pair of opposing formed sheet metal brackets 148. Each of the brackets 148 is secured to the adjacent side wall or plate 18 in a cantilever manner by a set of three carriage bolts 96 which extend through a corresponding set of the square holes 97 within the side plate 18. Each receiver unit 92 also includes a receiver block 152 (FIG. 2) which is preferably formed of a slightly resilient polyurethane plastics material and defines a channel 154 having a curved inner surface.

As also shown in FIG. 2, a crossover track 155 extends diagonally from each sender unit 90 supported by one side plate 18 to the receiver unit 92 supported by the opposite side plate 18. Each of the tracks 155 has an angular cross sectional configuration and includes a first linear section 158 which extends from a sender unit 90 and forms an angle of about 20 degrees with the adjacent side plate 18. The section 158 is connected by a curved section 159 to another linear section 162 which forms an angle of about 30 degrees with the adjacent side frame plate 18. The sections 162 connect with a support plate 164 forming part of the crossover switch unit 94. The plate 164 is mounted on a pair of channel-like cross members 166 (FIGS. 2 and 3) which are welded to end plates 167. The plates 167 are secured to the side frame plates 18 by a set of bolts 169 which also extend through the square holes 97 within the plates 18.

The crossover switch unit 94 includes a slide or diverter block 172 which is also constructed of a low friction rigid plastics material and defines a pair of opposing angle surfaces 174. The crossover diverter block 172 moves longitudinally in response to actuation of a fluid or air cylinder 176 (FIG. 2) for selectively aligning the surfaces 174 with the corresponding track sections 162. A V-shaped crossover divider block 178 (FIGS. 2 and 6) is supported by the plate 164 adjacent the block 172 and has outer vertical surfaces which align with corresponding linear crossover track sections 182 (FIG. 2). The track sections 182 connect the plate 164 to the plates 146 of the receiver units 92 and align with the curved inner surfaces defining the channels 154 within the receiver blocks 152. A pair of linear tracks 184 extend parallel to the side plates 18 directly between the sender and receiver units 90 and 92 of each crossover assembly.

Referring to FIG. 10, a pair of repositioning members or blocks 186 are constructed of a slightly resilient polyurethane plastics material and define corresponding curved or S-shaped channels 188. The blocks 186 are supported by a set of cross members 192 located at the drive or head end of the conveyor 15 and secured to the side frame plates 18. The channels 188 align with channels 194 mounted on brackets extending from the cross frame member 192.

A pair of resilient polyurethane guide disks 205 (FIG. 11) are supported by corresponding metal disks 207 projecting from corresponding hubs 208. The hubs 208 are mounted on the tail shaft 64 with the resilient disks 205 positioned in alignment with the curved channels 122 within the blocks 120. A similar pair of resilient disks 205 are mounted on the head or drive shaft 74 (FIG. 10) in alignment with each of the channels 194. The outer surfaces of the disks 205 are positioned to engage the bottom plate 52 of each pusher unit 40 as the tubes 34 and pusher units 40 are carried around each end shaft by the chains 32 extending around the sprockets 62. The disks 205 are spaced axially by a distance sufficient to receive the bearings or rollers 54 and 56 (FIG. 11) on each pusher unit 40 to maintain the alignment of the pusher units at opposite ends of the conveyor 15 as the carrier 30 travels around the end shafts 64 and 74.

The operation of the sorting conveyor 15 is substantially the same as the sorting conveyors disclosed in the above-mentioned patents. However, from the drawings and the above description, it is apparent that the present invention provides desirable features and advantages. For example, by providing the side frame plates 18 with the longitudinally spaced sets of holes 97 along the entire length of the sorting conveyor 15, the modular crossover sending units 90, receiver units 92 and switch units 94 may be conveniently located at any longitudinal position along the length of the conveyor according to the desired locations of the takeaway spur conveyors. Furthermore, in the event that it is desirable to relocate a spur conveyor or add another spur conveyor after the installation of the sorting conveyor 15, the units 90, 92 and 94 may be easily and quickly relocated or added to accommodate the spur conveyor.

Another important advantage is provided by the use of the lower and smaller guide bearing or roller 56 below the load carrying roller 54 on each of the pusher units 40. That is, the lower guide bearings 56 cooperate with the construction of the diverter blocks 102, alignment blocks 116 and repositioning blocks 120, 152 and 186 to provide for substantially extending the service life of these components and the pusher units in addition to reducing the operating noise of the conveyor. The guide bearings 56 on the pusher units also prevent reverse rotation of the larger load carrying bearings 54 when the pusher units 40 pass through the slightly resilient repositioning or relocating blocks 120, 152 and 186. This not only contributes to reduce wear on these blocks, but also permits higher speed operation of the sorting conveyor with less noise.

The multiple step divider block 132 of each sender unit 90 also provides a desirable feature. In the event the diverter block 102 is pivoting and a guide roller or bearing 56 engages the leading edge of the block portion 134, the pusher unit 40 will rise slightly until the guide bearing 56 rides on the step 137 and engages the cam surface 138 when the bearing 56 again picks up the outer guide surface of the V-shaped portion 134, and the larger load carrying bearing 54 picks up the upper V-shaped portion 136 of the block 132.

Another desirable feature is provided by the increase in the angle from each track section 158 to the connecting track section 162, such as from 20 degrees to 30 degrees, to provide for a smoother shifting of the packages laterally across the apron or carrier 30 by the pusher units 40 to the appropriate spur conveyor. This change in angle from the track section 158 to the track section 162 through the curved track section 159, significantly reduces the shock loading or impact on the packages, especially at a higher operational speed. A higher speed operation with reduced noise is also provided by the resilient disks 205 on the conveyor end shafts 64 and 74. As the pusher units 40 travel with the tubes 34 around the shafts 64 and 74, the disks 205 engage the bottom stiffener plate 52 on each pusher unit in order to press the slide blocks 42 outwardly against the supporting tubes 34 and avoid chatter of the pusher units on the tubes.

While the form of sorting conveyor apparatus herein described constitutes a preferred embodiment of the invention, it is to be understood that the invention is not limited to this precise form of apparatus, and that changes may be made therein without departing from the scope and spirit of the invention as defined in the appended claims.

The invention having thus been described, the following is claimed:

1. A sorting conveyor system for transporting and diverting packages and other articles, comprising a frame including parallel spaced elongated side frame members, an endless flexible carrier assembly extending between said side frame members and including parallel spaced carrier members each having opposite end portions, a set of endless flexible drive members supported for movement by said side frame members and connected to said end portions of said carrier members, drive means for moving said drive members and said carrier assembly, a series of pusher units supported by said carrier members for lateral movement between said side frame members, crossover means including a sender unit and a receiver unit supported by said side frame members and connected by means including a guide track extending diagonally between said side frame members, said pusher units each including means for engaging said sender and receiver units and said track for shifting said pusher units on said carrier members laterally between said side frame members, said sender unit including a multiple step divider member having an upper V-shaped guide surface and a lower V-shaped guide surface, said engaging means on each said pusher unit including a load carrying upper roller and a smaller guide roller disposed under said upper roller for engaging the respective said upper and lower guide surfaces, and a pivotally supported diverter member disposed adjacent said divider member and having a guide surface for engaging said smaller guide roller to provide for operating said conveyor system at a high speed with minimum noise and wear on said sender unit.

2. A conveyor system as defined in claim 1 wherein each of said upper and lower guide surfaces on said divider member includes a beveled vertical cam surface for engaging the corresponding said guide roller to avoid jamming of said pusher unit.

3. A conveyor system as defined in claim 1 and including a set of brackets mounted on opposite said side frame members and independently supporting said sender unit and said receiver unit, and each of side frame members including means for selectively positioning the corresponding said bracket at longitudinally spaced intervals along with side frame member.

4. A conveyor system as defined in claim 1 wherein said diverter member comprises a low friction plastics material defining a channel for guiding said smaller guide roller.

5. A conveyor system as defined in claim 4 wherein said sender unit includes an alignment member positioned adjacent said diverter member and having a low friction plastics material defining a channel for guiding said smaller guide roller.

6. A conveyor system as defined in claim 1 and including a repositioning member for said pusher unit and including a resilient plastics material forming surfaces for guiding said smaller guide roller.

7. A sorting conveyor system for transporting and diverting packages and other articles, comprising a frame including parallel spaced elongated side frame members, an endless flexible carrier assembly extending between said side frame members and including parallel spaced carrier members each having opposite end portions, a set of endless flexible drive members supported for movement by said side frame members and connected to said end portions of said carrier members, drive means for moving said drive members and said carrier assembly, a series of pusher units supported by said carrier members for lateral movement between said side frame members, a sender unit and a receiver unit supported by said side frame members and connected by means including a guide track extending diagonally between said side frame members, said pusher units each including means for engaging said sender and receiver units and said track for shifting said pusher units on said carrier members laterally between said side frame members, said receiver unit including a guide member having a guide surface, said engaging means on each said pusher unit including a load carrying upper roller and a smaller guide roller disposed under said upper roller, and said guide roller is disposed for engaging said guide surface on said guide member.

8. A conveyor system as defined in claim 7 wherein said curved guide surface is resilient and has a curved configuration.

9. A conveyor system as defined in claim 7 and including a guide block supported by one of said side frame members adjacent said sender unit and having a curved guide surface, and said guide surface is positioned to engage said smaller guide roller on each said pusher unit for directing said guide roller into said sender unit.

10. A conveyor system as defined in claim 9 wherein said guide block defines a curved channel, and said guide surface is formed by a step within said channel.

11. A sorting conveyor system for transporting and diverting packages and other articles, comprising a frame including parallel spaced elongated side frame members, an endless flexible carrier assembly extending between said side frame members and including parallel spaced carrier members each having opposite end portions, a set of endless flexible drive members supported for movement by said side frame members and connected to said end portions of said carrier members, drive means for moving said drive members and said carrier assembly, a series of pusher units supported by said carrier members for lateral movement between said side frame members, crossover means including a sender unit and a receiver unit disposed adjacent opposite said side frame members and connected by an elongated guide track extending diagonally between said side frame members, said pusher units including means for engaging said sender and receiver units and said track for shifting said pusher units on said carrier members laterally between said side frame members, and said side frame members including adjustable attachment means extending substantially the entire length of said side frame members for selectively positioning said sender and receiver units on said side frame members at selectively different longitudinally spaced locations within the length of said side frame members receiving said diagonally extending guide track for conveniently changing the position where said pusher units shift on said carrier members for diverting articles from said carrier assembly and for conveniently adding new sender and receiver units.

12. A conveyor as defined in claim 11 wherein said attachment means comprise means defining a series of longitudinally and uniformally spaced holes within each of said side frame members, and each of said sender and receiver units includes support means for receiving a set of fasteners for releasable securing said units to selected said holes at the desired longitudinal location.

13. A conveyor system as defined in claim 11 and including a pair of said sender units and a pair of said receiver units, each of said side frame members supporting one of said sender units and one of said receiver units, a set of crossing said guide tracks extending between corresponding said sender and receiver units, a crossover switch unit disposed at the crossing of said tracks, and said attachment means provides for selectively attaching said crossover switch unit to said side frame members at different longitudinally spaced locations within said length of said side frame members.

14. A conveyor system as defined in claim 11 wherein said adjustable attachment means comprise a series of longitudinally spaced sets of holes within each of said side frame members, and the spacing between adjacent sets of holes is about three inches.

15. A sorting conveyor system for transporting and diverting packages and other articles, comprising a frame including parallel spaced elongated side frame members, an endless flexible carrier assembly extending between said side frame members and including parallel spaced carrier members each having opposite end portions, a set of endless flexible drive members supported for movement by said side frame members and connected to said end portions of said carrier members, drive means for moving said drive members and said carrier assembly, a series of pusher units supported by said carrier members for lateral movement between said side frame members, crossover means including a sender unit and a receiver unit supported by said side frame members and connected by means including an elongated guide track extending diagonally between said side frame members, said sender unit including a V-shaped divider block having a longitudinally extending guide surface and a diverging guide surface, said track including a first linear portion forming a linear extension of said diverging guide surface of said divider block, said track including a second linear portion extending between said first linear portion and said receiver unit, said track further including a curved portion connecting said first and second linear portions, said pusher units including means for engaging said sender and receiver units and said track for shifting said pusher units on said carrier members laterally between said side frame members, said first linear portion of said track forming a first acute angle with one of said side frame members, and said second linear portion of said track forming a second acute angle greater than said first acute angle with said one side frame member to provide for high speed operation of said conveyor system with smoother lateral shifting of said pusher units and the articles.

16. A conveyor system as defined in claim 15 wherein said first acute angle is about twenty degrees and said second acute angle is about thirty degrees.

17. A sorting conveyor system for transporting and diverting packages and other articles, comprising a frame including parallel spaced elongated side frame members, an endless flexible carrier assembly extending between said side frame members and including parallel spaced carrier members each having opposite end portions, a set of endless flexible drive chains supported for movement by said side frame members and connected to said end portions of said carrier members, drive means for moving said drive chains and said carrier assembly and including a cross shaft supporting a set of sprockets engaging said chains, a series of pusher units supported by said carrier members for lateral movement between said side frame members, crossover means including a sender unit and a receiver unit supported by said side frame members and connected by means including an elongated guide track extending diagonally between said side frame members, said pusher units each including a base plate and projecting follower means for engaging said sender and receiver units and said track for shifting said pusher units on said carrier members laterally between said side frame members, a set of axially spaced resilient annular members supported by said cross shaft and including means forming corresponding resilient circular outer surfaces, and said annular members and said outer surfaces having sufficient diameter for engaging said base plates of said pusher units and for confining said follower means on said pusher units against axial movement relative to said cross shaft to provide said conveyor system with reduced operational noise over an extended period of service.

18. A conveyor system as defined in claim 17 wherein said follower means comprise a load carrying upper roller and a smaller guide roller disposed under said upper roller.

19. A conveyor system as defined in claim 17 wherein said annular members comprise a pair of axially spaced rigid plates mounted on said cross shaft and supporting corresponding resilient pads, means for removably attaching said resilient pads to said plates, and said pads project radially outwardly from said plates for engaging said base plate on each said pusher unit.

* * * * *